(12) United States Patent
Natanson et al.

(10) Patent No.: US 6,643,289 B1
(45) Date of Patent: Nov. 4, 2003

(54) METHOD OF MPOA STATUS CHANGE NOTIFICATION

(75) Inventors: Sarit Shani Natanson, Tel Aviv (IL); Lior Katzri, Givaataim (IL); Benny Gershon, Rehovot (IL); Ronit Aizicovich, Ramat Gan (IL)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/474,687

(22) Filed: Dec. 29, 1999

(51) Int. Cl.[7] .............................................. H04L 12/56
(52) U.S. Cl. .................................. 370/395.2; 709/223
(58) Field of Search ................................ 370/216, 235, 370/351, 395.2, 395.31, 395.51, 395.52, 395.53, 411; 709/222, 223, 230

(56) References Cited

U.S. PATENT DOCUMENTS

| | | | | |
|---|---|---|---|---|
| 5,812,552 A | * | 9/1998 | Arora et al. | 370/395.53 |
| 6,279,035 B1 | * | 8/2001 | Brown et al. | 709/224 |
| 6,363,072 B1 | * | 3/2002 | Furuichi | 370/395.52 |
| 6,487,168 B1 | * | 11/2002 | Hamami | 370/216 |

OTHER PUBLICATIONS

ATM FORUM AF–LANE–0084.000 LAN emulation over ATM, Jul. 1997.*
Przygienda Proxy PNNI augmented routing. ATM, 1998, ICATM-98, 1998 1st IEEE International Conference, pp. 371–377.*
CISCO IOS Switching Services Configuration Guide, LAN Emulation Overview, pp. XC–59–65.
LAN Emulation Over ATM Version 2—LUNI Specification—Letter Ballot, AF–LANE–0084.000, pp. 25–26, 29–33, 88–101.
LAN Emulation Over ATM, 1996, pp. 1–11.
ATM Forum Technical Committee, LAN Emulation Over ATM—Version 1.0, AF–LANE–0021.000, pp. 30–32, 100.
AF–MPOA–0087.000, MPOA Version 1, pp. 56–63.

* cited by examiner

Primary Examiner—Hassan Kizou
Assistant Examiner—Dmitry Levitan
(74) Attorney, Agent, or Firm—Howard Zaretsky

(57) ABSTRACT

A method of notification and handling of device status changes in MPOA enabled ATM based networks. In a first method notification of changes in device status configuration are provided by selectively releasing one or more Data Direct VCs that were previously established be LECs connecting MPOA Servers and MPOA Clients. An MPOA Server, upon detecting a change to its device configuration status, releases the Data Direct VCs connecting its associated LEC to known MPSs and MPCs that are neighbors to it. All MPOA devices for which a Data Direct VC was released delete all LE_ARP cache entries associated with the ATM destination of the released Data Direct VC. In a second method, each MPOA device periodically sends keep alive messages as targetless LE_ARP messages having a time to live TLV appended. An MPOA device receiving the keep alive message, refreshes (i.e., restarts) a validation timer for each association made by the corresponding MPOA identification TLV. If the validation timer expires before being refreshed, the MPOA device deletes all associations previously made by the corresponding MPOA identification TLV.

19 Claims, 5 Drawing Sheets

METHOD OF MPOA STATUS CHANGE NOTIFICATION

FIELD OF THE INVENTION

The present invention relates generally to data communication systems and more particularly, to a method of improving notification and handling of device status changes in MPOA enabled ATM based networks.

BACKGROUND OF THE INVENTION

Multi-Protocol Over ATM (MPOA)

The majority of networks, e.g., IP networks, are constructed from a plurality of nodes grouped together to form one or more subnets. Subnets are often built using various LAN technologies, with Ethernet and Token Ring being the most popular. Nodes in different subnets cannot normally communicate with each other. A router permits a node in one subnet to communicate with a node on a different subnet. Most internetwork layer protocols utilize routers to permit communications across subnet boundaries.

LAN Emulation (LE), as defined by the ATM Forum, provides Emulated LANs (ELANs) which emulate the services of Ethernet and Token Ring LANs across an ATM network. LE allows a subnet to be bridged across an ATM/LAN boundary. LE permits a single ATM network to support multiple ELANs. Utilizing ELANs, internetwork layer protocols can operate over an ATM network in essentially the same way they operate over Ethernet or Token Ring LANs. Although LE provides an effective means for bridging intra-subnet data across an ATM network, internetwork traffic still must be forwarded through routers.

The Next Hop Resolution Protocol (NHRP) and Multicast Address Resolution Server (MARS) protocols defined by the Internetworking Over NBMA (ION) Working Group, also permit internetwork layer protocols to operate over an ATM network. These protocols permit the ATM network to be divided into multiple ION subnets, also known as Logical IP Subnets (LISs) or Local Access Groups (LAGs). Routers are required, however, to interconnect these subnets. NHRP, however, allows intermediate routers to be bypassed on the data path. NHRP provides an extended address resolution protocol that permits Next Hop Clients (NHCs) to send queries between different subnets. Queries are propagated by Next Hop Servers (NHSs) along the routed path as determined by standard routing protocols. This enables the establishment of ATM VCCs across subnet boundaries, permitting inter-subnet communication without requiring routers in the data path.

Notwithstanding the availability of LANE and NHRP, a common situation exists wherein communicating LAN devices are behind LANE edge devices. The use of Multi-Protocol Over ATM (MPOA) permits these edge devices to perform internetwork layer forwarding and establish direct communications without requiring that the LANE edge devices comprise full function routers.

MPOA functions to provide an efficient transfer of inter-subnet unicast data in a LE environment. MPOA integrates LE and NHRP so as to preserve the benefits of LE, while allowing inter-subnet, internetwork layer protocol communication over ATM VCCs without requiring routers in the data path. MPOA provides a framework for effectively synthesizing bridging and routing with ATM in an environment of diverse protocols and network technologies. This framework provides a unified paradigm for overlaying internetwork layer protocols on ATM. MPOA is capable of using both routing and bridging information to select a shortcut through the ATM cloud to the egress MPC.

MPOA permits the physical separation of internetwork layer route calculation and forwarding, a technique known as virtual routing. This separation has the advantages of: (1) allowing efficient inter-subnet communications; (2) increasing manageability by decreasing the number of devices that must be configured to perform internetwork layer route calculation; (3) increases scalability by reducing the number of devices participating in internetwork layer route calculation; and (4) reduces the complexity of edge devices by eliminating the need to perform internetwork layer route calculation.

MPOA provides MPOA Clients (MPCs) and MPOA Servers (MPSs) and defines the protocols that are required for MPCs and MPSs to communicate. MPCs function to issue queries for shortcut ATM addresses and to receive replies from the MPS using these protocols. MPOA also functions to ensure interoperability with the existing infrastructure of routers. MPOA Servers utilize routers that run standard internetwork layer routing protocols, e.g., Open Shortest Path First (OSPF), providing a smooth integration with existing networks.

The primary function of the MPC is to source and sink internetwork shortcuts. The MPC performs internetwork layer forwarding but does not run internetwork layer routing protocols. The MPC detects ingress flows of packets that are forwarded over an ELAN to a router that comprises an MPS. When it recognizes a flow that could benefit from a shortcut that bypasses the routed path, it uses an NHRP based query/response protocol to request the information required to establish a shortcut to the destination. If a shortcut is available, the MPC caches the information in its ingress cache, sets up a shortcut VCC and forwards frames for the destination over the shortcut.

The MPC receives egress internetwork data frames from other MPCs to be forwarded to its local interface and/or users. For frames received over a shortcut, the MPC adds the appropriate encapsulation/header and forwards them to the higher layers. The encapsulation is provided to the MPC by the egress MPS and stored in the egress cache in the MPC. Note that an MPC is able to service multiple LECs and communicates with multiple MPSs. In addition, there may be multiple MPCs in an edge device. A given LEC, however, may be associated with only a single MPC.

An MPS is the logical component of a router that provides internetwork layer forwarding information to the MPCs. It comprises a full NHRP implementation with extensions as defined in the ATM Forum Multi-Protocol Over ATM Specification Version 1.0, AF-MPOA-0087.000, July 1997, incorporated herein in its entirety by reference. The MPS interacts with its local NHS and routing functions to reply to MPOA queries from ingress MPCs and provides encapsulation information to egress MPCs. Note that an MPS converts between MPOA requests and replies and NHRP requests and replies on behalf of MPCs. In addition, there may be multiple MPSs in a router. A given LEC, however, may be associated with only a single MPS.

An MPOA solution generally comprises a plurality of MPOA control flows and MPOA data flows. All control and data flows are carried over ATM VCCs. Control flows use MPOA control VCCs. Note that these VCCs can be used for other protocols (e.g., LE, etc.) as well in a multiplexed mode. Data flows, on the other hand, are carried over either LE VCCs (i.e., the default path) or over shortcut VCCs established via MPOA.

MPOA performs the following operations: configuration, discovery, target resolution, connection management and data transfer. Configuration includes obtaining the appropriate configuration information in both MPC and MPS. Normally, MPOA components receive configuration information from the LECS. Discovery involves MPCs and MPSs learning of each other's existence. MPOA components automatically discover each other using extensions to the LE LE ARP protocol that carry the MPOA device type (i.e., MPS, MPC) and ATM address. This information may change and must be periodically verified and updated if necessary. An MPOA device type TLV can be included in the following LE messages: LE_REGISTER request and response, LE ARP request and response and targetless LE_ARP request.

Target resolution denotes the determining of the mapping of a target to an egrss ATM address, an optional tag and a set of parameters used to setup a shortcut to forward packets across subnet boundaries.

Connection management entails creating, maintaining and terminating VCCs for the purpose of transferring control information and data. MPOA components establish VCCs between each other as necessary to transfer control and data messages over the ATM network. The goal of MPOA is the efficient transfer of unicast data within the ATM cloud. Unicast data flow can comprise either the default flow or the shortcut flow. The default flow follows the routed path over the ATM network whereby the MPOA edge device functions as a layer 2 bridge. Shortcuts are established using the MPOA target resolution and cache management mechanisms. When an MPC has an internetwork protocol packet to send for which it has a shortcut, the MPOA edge device functions as an internetwork level forwarder and sends the packet over the shortcut.

A block diagram illustrating an example MPOA network comprising a plurality of MPSs and MPCs wherein the default path and shortcut path are highlighted, is shown in FIG. 1. The network, generally referenced 10, comprises a source end station 22, plurality of MPCs 12, labeled MPC #1 and #2, a plurality of ELANs 14, a plurality of MPSs 16, labeled MPS #1 and #2, destination end station 24 and ATM cloud 26. The default path is represented by dashed arrow 18 while the shortcut is represented by solid arrow 20.

The ingress MPC (e.g., MPC #1) learns the MAC addresses of the MPSs (e.g., MPS #1) attached to its ELANs from the device type TLVs in LE_ARP responses. The MPC performs flow detection, based on internetwork layer destination addresses, on packets destined for these learned MAC addresses. Although default forwarding is via routers, if an MPC becomes aware of a particular traffic flow that might benefit from a shortcut, the ingress MPC then determines the ATM address associated with the egress device. The ingress MPC sends an MPOA Resolution Request message to the appropriate ingress MPS in order to obtain the ATM address for a shortcut. The MPS resolves the MPOA Resolution Request and a reply is returned to the ingress MPC containing the ATM address of the egress device.

The ingress MPS processes MPOA Resolution Requests sent by local MPCs. It may answer the request if the destination is local or it may re-originate the request along the routed path through its local NHS.

When an NHRP Resolution Request targeted for a local MPC arrives at the egress MPS serving that MPC, the egress MPS sources an MPOA Cache Imposition Request and sends it to the egress MPC. This request is part of the cache management protocol that serves to provide encapsulation and state maintenance information needed by the egress MPC (e.g., MPC #2). The corresponding reply provides status, address and ingress tagging information needed by the egress MPS (e.g., MPS #2) in forming the NHRP Resolution Reply.

The egress MPC (e.g., MPC #2) checks to determine whether it has sufficient resources to maintain the cache entry and potentially receive a new VCC and replies accordingly. The Egress MPS sends an MPOA Cache Imposition Reply for every MPOA Cache Imposition Request.

With reference to FIG. 1, a packet generated by the source end station enters the MPOA system at the ingress MPC (MPC #1). The MPC creates a new cache entry for new flows that are detected. If a valid shortcut does not already exist for the flow, the MPC begins counting frames. When a threshold is exceeded, a MPOA Resolution Request is sent to the MPS to request a shortcut. By default, the packet is bridged via LE to a router. If the packet is not to follow the default path, i.e., it is part of a flow for which a shortcut has previously been established, it is sent via the shortcut. If the packet comprises a new flow, each packet sent to an MPS is logged and counted (by internetwork layer destination address) as it is being sent via LE. When a threshold (a number of packets within a given period of time) is exceeded, the MPC sends an MPOA Resolution Request to obtain the ATM address to be used for establishing a shortcut to a particular downstream element (e.g., an egress MPC).

When the packet arrives at the egress MPC (e.g., MPC #2) via the shortcut, it is examined and either a matching egress cache entry is found or the packet is dropped and an error is indicated. If a match is found, the packet is encapsulated using the information in the egress cache and then forwarded to a higher layer.

As described previously, the MPOA standard includes a mechanism for automatically discovering other devices in a dynamic manner. More specifically, an MPOA device is uniquely identified by its control ATM address that is discovered by neighboring MPOA devices. Note that it is important for MPOA Clients to have knowledge of the MAC and ATM addresses of the local MPOA Servers in order that MPOA requests may be sent. Further, the MPOA Server must know if an NHRP request resolved to the ATM address of an MPOA Client so that a cache imposition may be sent. In addition, MPOA Servers that share an ELAN must be able to discover the existence of each other in order to facilitate the forwarding of NHRP messages.

To accomplish the above requirements, the MPOA discovery process is based on the mechanism provided for by LANE messaging which has been extended with MPOA Device Type TLVs (Type, Length, Value), e.g., LE_ARP control frames.

In addition, an MPOA device should notify its neighboring MPOA devices about changes to the device's 'Device Status Configuration' that each device is aware of and is maintained internally. Such changes include, for example, a device changing its configuration to enable or disable an MPOA Server or Client associated with a LEC, or to disassociate a LEC from an MPOA Server or Client.

Currently, the prior art provides the following ways to notify other MPOA aware devices of changes in the configuration of an MPOA Server or Client or associated LEC device. In a first way, a LEC or MPOA Server or Client may terminate its membership in an ELAN and/or cease operations for a period of time that is longer than the maximum LE_ARP time-out period. The maximum LE_ARP time-out period is specified to be five minutes in the ATM Forum LANE Version 1.0 and 2.0 standards which is a relatively long time in the context of a network.

An advantage of this technique is that it is reliable. Once the time period has passed, the change will be detected with a high degree of probability. The disadvantages, however, are that all network traffic to and from the ELAN ceases for a relatively long time, e.g., five minutes. The ELAN must wait the entire five minutes (i.e., until the LE_ARP cache time out) before the device's neighbors discover the change in status. In addition, when the LEC becomes operational again, there is a sharp surge in network traffic from the traffic that was waiting to be sent during the period of time the LEC was not operational. This creates a traffic load with the potential to create congestion and bottlenecks in the network.

In a second way of notifying other MPOA devices of the changes in configuration, a LEC sends one or more targetless LE_ARP_REQUEST messages (via TLV extensions) so as to update the MPOA Server or Client associations of other LECs. The advantages of this technique are that the traffic load is minor and there is no waiting time with the subsequent surge in network traffic. The absence of a network disturbance is offset, however, by decreased reliability in that there is no ACK message to ensue delivery and acceptance of the LE ARP REQUEST message. There is no certainty that the message reached its intended target. For example, in the case when the message is delivered via the LAN Emulation Server (LES), if the LES is congested at that time it may drop the frame. Thus, the target LEC may never receive the message.

In a third way of notifying other MPOA devices of the changes in configuration, an MPOA Server or Client responds to an MPOA request with an error code that indicates 'this device is no longer an MPOA Server (or Client)'. The error codes to indicate this are defined in the ATM Forum MPOA standard in Section 4.2.4. This technique has an advantage in that there is no waiting time and no consequent disturbance to the network. On the other hand, however, a disadvantage is that this creates a conflict in that the other MPOA Servers and Clients in the network do not receive this notification. The other devices in the network continue to consider this device to be an MPOA Server or Client.

In addition, another disadvantage is the late response of neighbor devices to status changes resulting in potentially high traffic loads. In some cases, this results in more traffic generated than if the device did not return an error code. Further, another disadvantage is that this technique only addresses the case when a device is no longer an MPOA device. In other words, the technique is only applicable to the case when a device was previously an MPOA device and is currently not an MPOA Server or Client anymore. This, however, represents only one possible type of device status change as there are many others that may occur.

SUMMARY OF THE INVENTION

The present invention is a method of notification and handling of device status changes in MPOA enabled ATM based networks. The present invention comprises two methods an MPOA device can utilize to notify changes about its device status configuration. The first method is based on the release of LANE data direct VCs (DDVCs) previously established between LECs. The second method is based on each MPOA device periodically sending keep alive or similar messages.

The first method provides notification of changes in device status configuration by selectively releasing one or more Data Direct VCs tat were previously established between LECs connecting MPOA Servers and MPOA Clients. An MPOA Server, upon detecting a change to its device configuration status, releases the Data Direct VCs connecting its associated LEC to other LECs associated with known MPSs and MPCs that are neighbors to it. All MPOA devices for which a Data Direct VC was released, delete all LE_ARP cache entries associated with the ATM destination of the released Data Direct VC. Further, an MPC, upon detecting a change to its device configuration status, releases the Data Direct VCs connecting its associated LEC to other LECs associated with known MPSs.

In the second method, each MPOA device adapted to perform the method of the present invention, periodically sends out keep alive messages to neighboring MPOA devices. The keep alive message is preferably a targetless LE_ARP message. This message comprises the standard MPOA identification TLV and a new MPOA-VALID TLV that indicates the validation time-out period for that entry. A validation time-out field is added to each entry in the LE_ARP cache table to indicate the time remaining to maintain a valid entry. An MPOA device receiving the keep alive message, refreshes (i.e., restarts) a validation timer for each association made by the corresponding MPOA identification TLV. If the validation timer expires before being refreshed, the MPOA device deletes all associations previously made by the corresponding MPOA identification TLV.

Note that if an MPOA device that is not adapted to perform the method of the present invention receives a message with the MPOA-VALID TLV, it ignores the message and operates in accordance with the MPOA standard.

There is provided in accordance with the present invention, in an Asynchronous Transfer Mode (ATM) based Multiple Protocol Over ATM (MPOA) network running LAN Emulation (LE), a method of notifying devices in the network of changes in device configuration status, the method comprising the steps of detecting changes in device status configuration in an MPOA device, releasing all LE Data Direct VCs (DDVCS) to all LAN Emulation Client (LEC) ATM addresses associated with known MPOA Server and MPOA Client neighbors, if the MPOA device comprises an MPOA Server, releasing all LE Data Direct VCs (DDVCs) to all LEC ATM addresses associated with known MPOA Server neighbors, if the MPOA device comprises an MPOA Client and deleting all table entries associated with LEC ATM destination addresses of released DDVCs in an MPOA device for which a DDVC was released.

The step of detecting may comprise the step of detecting the starting of an MPOA Server; the stopping of an MPOA Server, the starting of an MPOA Client, the stopping of an MPOA Client, the starting of a LEC associated with an MPOA device, the stopping of a LEC associated with an MPOA device, the association of a LEC with an MPOA device or the de-association of a LEC with an MPOA device.

There is further provided in accordance with the present invention, in an Asynchronous Transfer Mode (ATM) based Multiple Protocol Over ATM (MPOA) network running LAN Emulation (LE), a method of notifying devices in the network of changes in device configuration status, the method comprising the steps of associating a validation time-out field with each MPOA device type TLV associated with a LAN Emulation Client (LEC) ATM address and registered within each MPOA device, periodically sending a keep alive message to neighboring MPOA devices, receiving the keep alive message by an MPOA Server or Client and in response thereto, restarting a validation timer corresponding to a validation time-out field associated with a registered MPOA device type TLV and deleting an MPOA device type TLV entry corresponding to a LEC ATM address whose validation timer expires before a refresh of the validation timer is received.

The keep alive message comprises a targetless LE_ARP message having a standard MPOA Type, Length, Value (TLV) and an MPOA-VALID TLV specifying the value $T_2$ of the validation time-out field. Alternatively, the keep alive message comprises a targetless LE_ARP message having a standard MPOA Type, Length, Value (TLV) and an MPOA-VALID TLV specifying the value $T_2$ of the validation time-out field whereby $T_2$ is given by $T_2=N_1 \times T_1$, whereby $T_1$ is represents the time between the sending of the keep alive messages and $N_1$ is a positive integer.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

Figure 1:
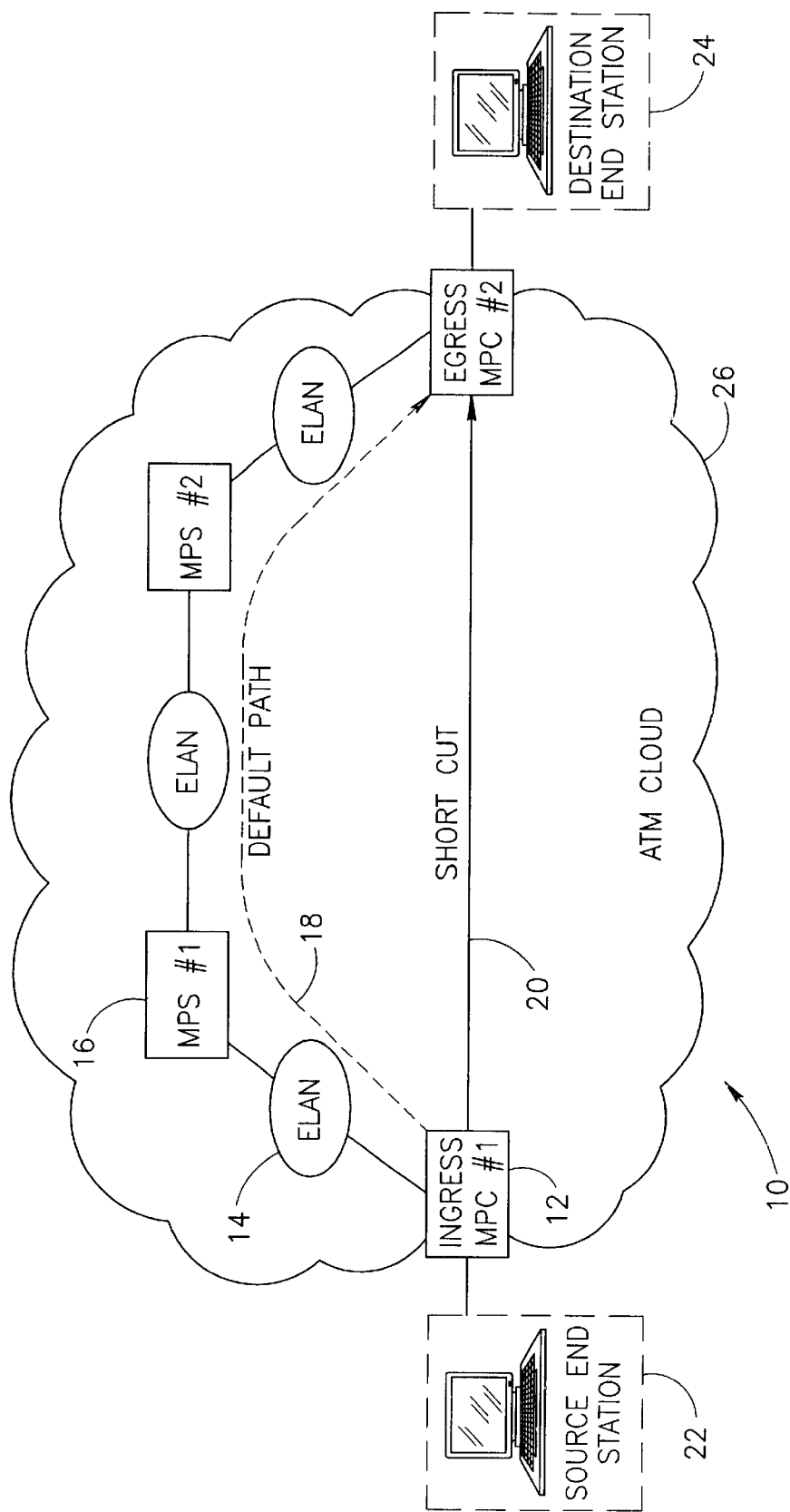
FIG. 1 is a block diagram illustrating an example MPOA network comprising a plurality of MPSs and MPCs.

The following notation is used throughout this document.

| Term | Definition |
|---|---|
| ARP | Address Resolution Protocol |
| ATM | Asynchronous Transfer Mode |
| DDVC | Data Direct Virtual Circuit |
| ELAN | Emulated LAN |
| IETF | Internet Engineering Task Force |
| ION | Inter-networking Over NBMA |
| IP | Internet Protocol |
| LAG | Local Access Group |
| LAN | Local Area Network |
| LANE | LAN Emulation |
| LE | LAN Emulation |
| LEC | LAN Emulation Client |
| LECS | LAN Emulation Configuration Server |
| LES | LAN Emulation Server |
| LIS | Logical IP Subnet |
| MAC | Media Access Control |
| MARS | Multicast Address Resolution Server |
| MPC | MPOA Client |
| MPOA | Multi-Protocol Over ATM |
| MPS | MPOA Server |
| NBMA | Non-Broadcast Multi-Address |
| NHC | Next Hop Client |
| NHRP | Next Hop Resolution Protocol |
| NHS | Next Hop Server |
| OSPF | Open Short Path First |
| TLV | Type, Length, Value |
| VCC | Virtual Channel Connection |

The following definitions apply throughout this document.

| Term | Definition |
|---|---|
| Control Flow | A bidirectional flow of control messages (e.g., NHRP and MPOA messages) between two MPOA components (i.e., MPS or MPC). |
| Data Flow | A unidirectional flow of packets to a single destination used by an MPOA component. |
| Default Path | The hop by hop path between routers that a packet would travel in the absence of shortcuts, as determined by routing protocols. |
| Edge Device | A physical device capable of bridging packets between one or more LAN interfaces and one or more LAN Emulation Clients. An Edge Device also comprises one or more MPOA Clients permitting it to forward packets across subnet boundaries using an Internetwork protocol. |
| Egress Cache | The collection of Egress Cache Entries in an MPC. |
| Egress Cache Entry | Information describing how Internetwork Layer packets from a particular shortcut are to be encapsulated and forwarded. |
| Flow | A stream of packets between two entities. Multiple flows may be multiplexed over a single VCC. |
| Ingress Cache | The collection of Ingress Cache Entries in an MPC. |
| Ingress Cache Entry | The collection of information dealing with inbound data flows. This information is used to detect flows that may benefit from a shortcut, and once detected, indicates the shortcut VCC to be used and encapsulation information to be used on the frame. |
| Internetwork Layer | The protocols and mechanisms used to communicate across subnet boundaries, e.g., IP, IPv6, IPX, AppleTalk DDP, SNA, etc. |
| MPOA Client | A protocol entity that implements the client side of the MPOA protocol. |
| MPOA Host | A host containing one or more LAN Emulation Clients allowing it to communicate using LAN Emulation. An MPOA Host contains one or more MPOA Clients allowing it to transmit packets across subnet boundaries using an internetwork Layer protocol. |
| MPOA Server | A protocol entity that implements the server side of the MPOA protocol. |
| Shortcut | An ATM VCC used to forward data packets in lieu of the default routed path. |
| Target | An Internetwork Layer Address to which a shortcut is desired. |

General Description

The present invention is a method of notification and handling of device status changes in MPOA enabled ATM based networks. The present invention comprises two methods an MPOA device can utilize to notify changes about its device status configuration. The first method is based on the release of LANE data direct VCs (DDVCs) previously established between LECs. The second method is based on each MPOA device periodically sending keep alive or similar messages. Each method is described in more detail below.

To aid in understanding the principles of the present invention, an example MPOA based ATM network is presented. Note, however, that the example network is presented for illustration purposes only and is not intended to limit the scope of the invention. It will be appreciated that one skilled in the networking arts can adapt the principles of the present invention to numerous other MPOA networks as well.

Figure 2:
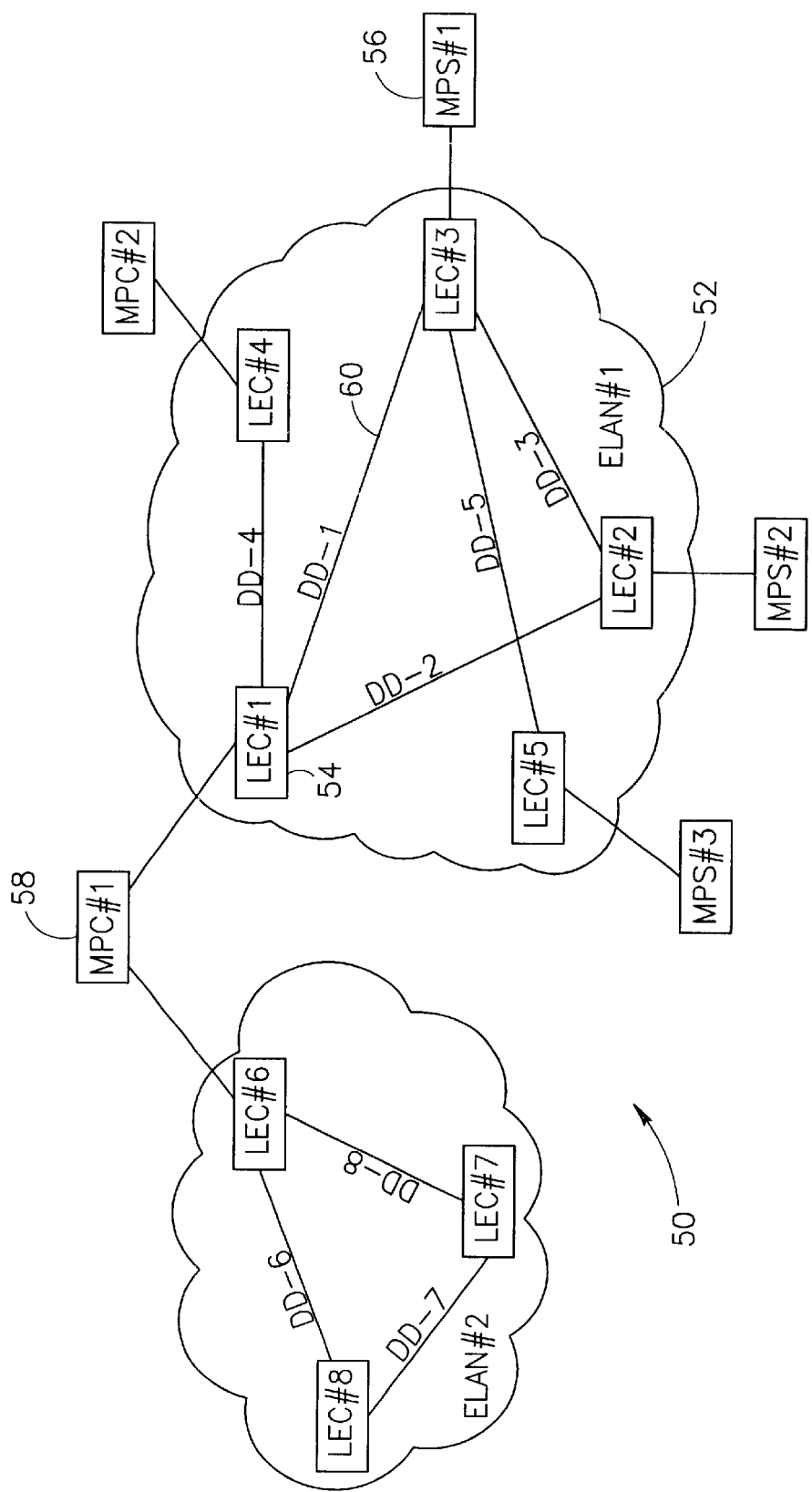
FIG. 2 is a block diagram illustrating an example MPOA network comprising two ELANs having a plurality of LECs in each ELAN.

A block diagram illustrating an example MPOA network comprising two ELANs having a plurality of LECs in each ELAN is shown in FIG. 2. The example MPOA network, generally referenced 50, comprises a plurality of ELANs 52, labeled ELAN #1 and ELAN #2, a plurality of MPSs 56, labeled MPS #1 through MPS #3, a plurality of MPCs 58, labeled MPC #1 and MPC #2 and a plurality of LECs 54, labeled LEC #1 through LEC #8. The LECs, MPSs and MPCs are connected via a plurality of connections 60 some of which are Data Direct VCs labeled DD-1 through DD-8.

As shown in FIG. 2, MPC #1 is connected to LEC #1 belonging to ELAN #1 and LEC #6 belonging to ELAN #2; and MPC #2 is connected to LEC #4. MPS #1 is connected to LEC #3, MPS #2 is connected to LEC #2 and MPS #3 is connected to LEC #5.

The first and second methods of the present invention provide new and novel means for an MPOA device to notify other devices in the network of changes in its 'Device Configuration Status' as part of the MPOA discovery process. The main purpose of the present invention is to keep the status information in an MPOA device valid. The content of the information is not critical to the invention.

Both methods of the invention are effective to handle the following specific changes in Device Status Configuration: (1) the starting or stopping of an MPOA Server or Client; (2) the starting or stopping of a LEC associated with an MPOA device; and (3) the associating or de-associating of a LEC with an MPOA device. Both methods of the present invention presented herein are relatively simple, reliable and take effect immediately without the time-out period required of prior art techniques described in the Background section of this document. In addition, the methods of the present invention do not load the network and reduce the damage to active ELAN network traffic.

First Status Change Notification Method—Data Direct VC

Figure 3:
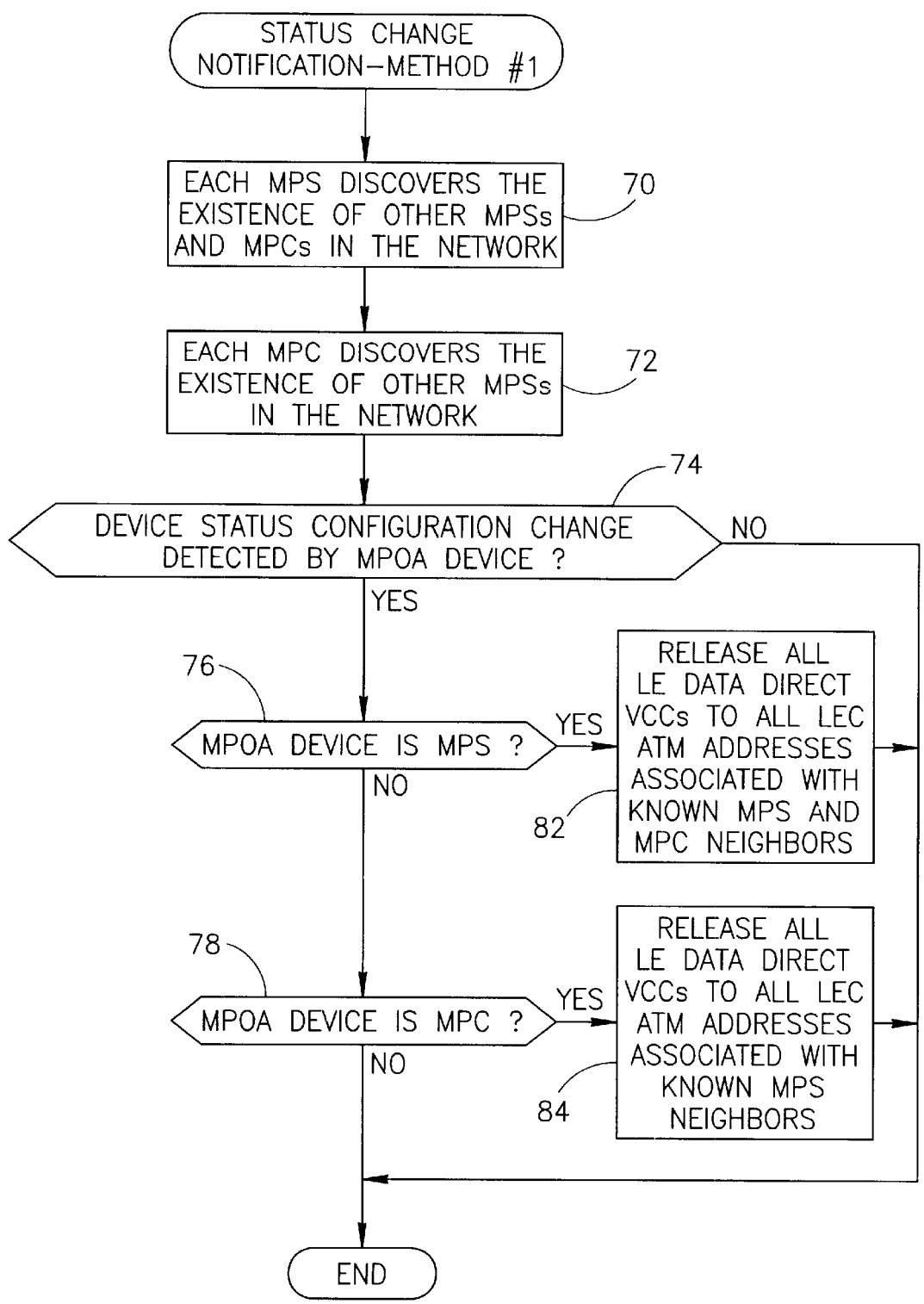
FIG. 3 is a flow diagram illustrating the first status change notification method of the present invention.

A flow diagram illustrating the first status change notification method of the present invention is shown in FIG. 3. It is important to note that for an MPOA network to take full advantage of the first method of the present invention, the devices on both ends of a connection must be adapted to perform the method of the present invention. If only one device on either end of the connection performs the method of the invention, the network will not notify changes in configuration status changes in accordance with the invention. The normal operation of the network, however, is not affected and functions in accordance with prior art MPOA networks.

In operation, only the entity in the device (e.g., LEC, MPOA device or $3^{rd}$ party) that is responsible for management of the LE_ARP table and MPOA Device Type TLV table of the present invention need be adapted to perform the method of the present invention. MPOA Servers and Clients must be adapted to notify their associated LECs about status changes, i.e., MPS or MPC being enabled or disabled, starting or stopping of a LEC, associated LEC ATM addresses.

The method utilizes the LE_ARP cache table that is created and maintained in each LEC in addition to creating a new MPOA Device Type table to hold MPOA device type and associated LEC ATM addresses. The LE_ARP table functions to store, among other things, MAC to ATM address mappings. Each ATM entry in the cache, however, may have multiple MAC addresses associated therewith. The ATM addresses are used to establish the Data Direct VCs from one LEC to another, i.e., from one ATM address to another. Each Data Direct VC is usually related to more than one entry in the LE_ARP cache table since the LEC is typically an edge device having a LAN positioned behind it representing a potentially large number of MAC addresses.

An example of an LE_ARP cache table that resides on each MPOA device is presented below in Table 1.

TABLE 1

MPOA LE_ARP Cache Table

| LEC ATM Address | MAC Address |
|---|---|
| ATM A1 | MAC M1 |
| ATM A1 | MAC M2 |
| ATM A1 | MAC M3 |
| ATM A2 | MAC M4 |
| ATM A3 | MAC M5 |
| ATM A3 | MAC M6 |

A MPOA Device Type TLV table is also created in each MPOA device, an example of which is shown below in Table 2.

TABLE 2

MPOA Device Type Table

| Device Type TLV | LEC ATM Address |
|---|---|
| MPS | ATM A1 |
| MPC | ATM A2 |
| MPC | ATM A3 |

Table 1 presented above illustrates an example LE_ARP cache table having a plurality of entries. Each LEC ATM address (i.e., ATM address A1) may have more than one MAC address associated therewith. The MAC addresses, however, are unique and are different for each record, i.e., MAC address M1, M2 and M3. Table 2 holds the mappings between MPOA device type TLV and LEC ATM address. Note that all the LEC ATM addresses present in Table 2 must also have entries in Table 1 since for an ATM address to appear in Table 2, the device by default must already know about its MAC address. The reverse, however, is not necessarily the case as not all LECs send the TLV since not all are MPOA devices. Note that Tables 1 and 2 may be implemented as individual tables or as a single combined table without effecting the operation of the invention.

The data stored in the Device Type TLV field comprises the type of device (MPS, MPC, MPS/MPC or non-MPOA device), MPS MAC addresses (if the type is MPS), MPS Control ATM address (if the type is MPS) and MPC Control ATM address (if the type is MPC). Note that in accordance with the MPOA standard, each MPOA component registers its MPOA Device Type TLV with each LEC on which it is configured.

With reference to FIG. 3, the MPOA network is initialized at some time and each MPS discovers the existence of other MPSs and MPCs in the network (step 70). During operation of the network, each MPOA Server is adapted to be aware of the existence of other MPOA Servers and Clients. Similarly, each MPC discovers the existence of MPSs in its network via device discovery involving LECs in their respective ELANs (step 72). During operation of the network, each MPOA Client is adapted to be aware of neighboring MPOA Servers that are within the ELAN of its associated LECs. Note that there may be more than one MPS within an ELAN. Note also that the LECs are aware of and take part in the ELAN.

Eventually, as the network operates and devices are added and removed, the configuration status of one or more devices will change. In accordance with the method of the invention, these changes are detected and other MPOA devices will be quickly notified of the changes without the time-out waiting period, unreliability, network congestion, etc. associate with prior art notification techniques.

In accordance with the present invention, MPOA devices must become aware of changes in their device configuration status. The detection of status changes is a normal function of MPOA devices as described in the ATM Forum MPOA standard specification Section 4.2.4. Thus, each MPOA device is adapted to detect changes in device status configuration. Each MPOA device is adapted to detect the following specific changes in Device Status Configuration: (1) the starting or stopping of an MPOA Server or Client; (2) the starting or stopping of a LEC associated with an MPOA device; and (3) the associating or de-associating of a LEC with an MPOA device.

As stated in the ATM Forum MPOA standard specification Section 4.2.4. in order for MPOA-aware devices to be able to trust just one LE_ARP request of response, a device must be careful when changing its configuration to start or stop an MPS or MPC, start or stop an associated LEC, or associate an LEC with, or disassociate an LEC from, an MPS or MPC. There are a number of ways to notify other MPOA-aware devices of a change in the configuration of an MPS, MPC, or associated LEC:

1. A LEC or MPC or MPS may terminate ELAN membership and/or cease operations for a significantly longer period than the maximum LE_ARP time-out period (5 minutes in [LANE]). This ensures that information about the device will age out.
2. A LEC may send one or more Targetless LE ARP REQUESTs to update other LECs' MPS/MPC associations. Such a Targetless LE_ARP REQUEST may be sent more than once for reliability, and may be sent each time an indication (such as an MPOA request sent to a device in which the MPC or MPS is no longer active) is received that some other device is confused.
3. An MPC (MPS) may respond to an MPOA request with error code 0x86 (0x87), meaning, "this device is no longer an MPC (MPS)."

Of all these methods only the first is a reliable means for a device to notify all other devices of a change in its configuration.

If a change in device status configuration is detected (step 74), the response elicited depends on the type of device. If the device is an MPOA Server that changed device configuration status (step 76), then all LANE Data Direct VCs that are destined to LEC ATM addresses associated with known MPOA Server and MPOA Client neighbors are released using standard signaling procedures (step 82). It is important to note that Data Direct VCs are released only to MPOA Servers and Clients that the MPOA Server has knowledge of.

If the device is an MPOA Client that changed device configuration status (step 78), then all LANE Data Direct VCs that are destined to LEC ATM addresses associated with known MPOA Servers are released using standard signaling procedures (step 84). It is important to note that Data Direct VCs are released only to MPOA Servers that the MPOA Client has knowledge of. Those connections to MPOA Servers that it does not have knowledge of are not released.

Figure 4:
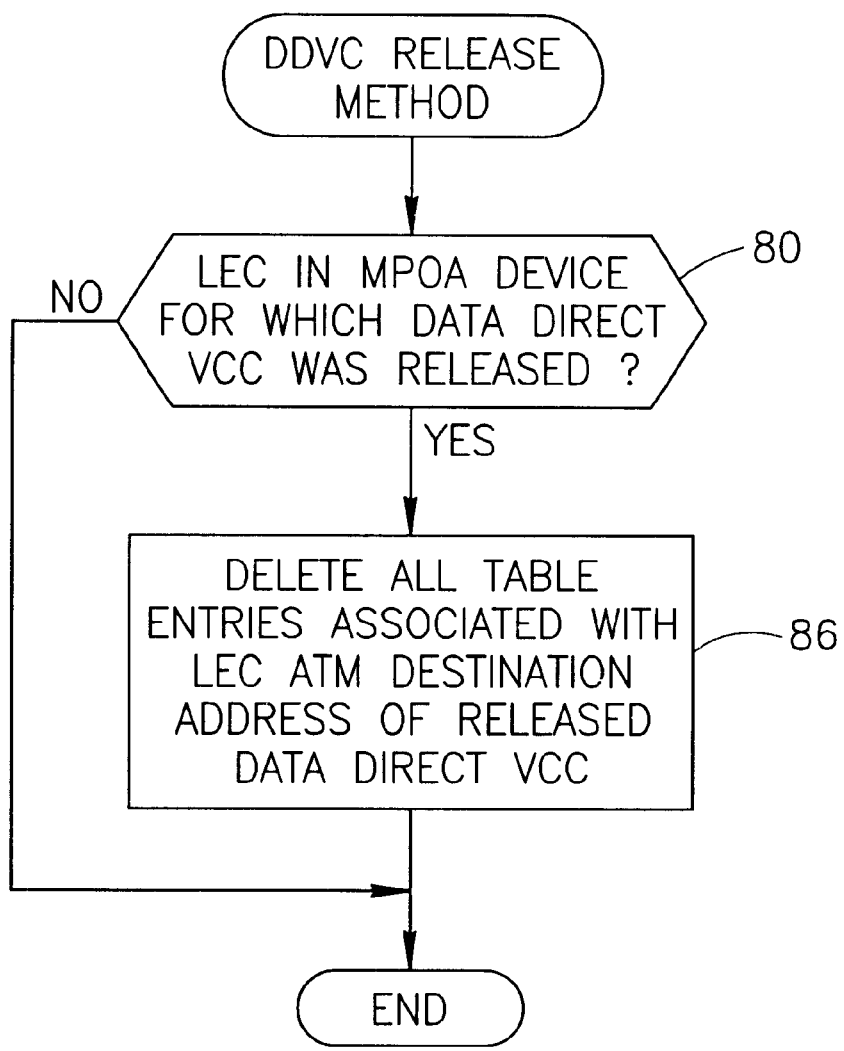
FIG. 4 is a flow diagram illustrating the DDVC release method portion of the first status change notification method of the present invention.

A flow diagram illustrating the DDVC release method portion of the first status change notification method of the present invention is shown in FIG. 4. If the device is an MPOA device for which a Data Direct VC was released, i.e., both ends of a connection between wherein at least one end has an MPOA device with a device status configuration change, (step 80) than (1) all LE_ARP cache table entries associated with the ATM destination address of the released DDVC are deleted and (2) all entries associated with the LEC ATM address in the MPOA Device Type TLV table are also deleted (step 86).

The above described method is applicable to and can be configured to be run on all MPOA Server and Client devices related to LECs so as to notify other devices on the network that the configuration status of one or more devices has changed. The release of the Data Direct VCs is actually performed by the individual LEC in the same MPS or MPC device that detected the change in configuration status. Once the Data Direct VC is released, new correct device configuration information will be discovered immediately via the LE_ARP request and response messaging using TLV extensions as provided for in standard LANE and MPOA.

As an example, consider the MPOA network illustrated in FIG. 2. If MPS #2 that is connected to LEC #2 is stopped, LEC #2 will detect that MPS #2 has stopped operating. In response thereto, LEC #2 releases the Data Direct VCs connecting it with neighboring MPSs and MPCs, DD-3 connecting LEC #2 to LEC #3 (MPS #1) and DD-2 connecting LEC #2 to LEC #1 (MPC #1). Note that, as described hereinabove, the release of the Data Direct VCs is for a short period as they are typically re-created quickly via the LE_ARP message exchange procedure which re-discovers the network and takes into account the updated device status configuration of the devices in the network.

Consider also that LEC #1 was not previously associated with MPC #1 and, via the user, an association is created between LEC #3 and MPC #1. Via the operation of the first method, the Data Direct VCs DD-1 and DD-2 are released. As in the previous example, they are re-created quickly via the LE_ARP message exchange procedure that re-discovers the network and takes into account the updated device status configuration of the devices in the network. Note that Data Direct VC DD-4 is not released since only Data Direct VCs to known neighboring MPSs are released.

Second Status Change Notification Method—Keep Alive Messages

In the first method described hereinabove, notification of status configuration changes in an MPOA device was effected by releasing one or more Data Direct VCs so as to force discovery of devices on the network anew. In a second method of notifying devices in the network about status configuration changes, keep alive messages are used to detect when a change to a device occurs.

Figure 5:
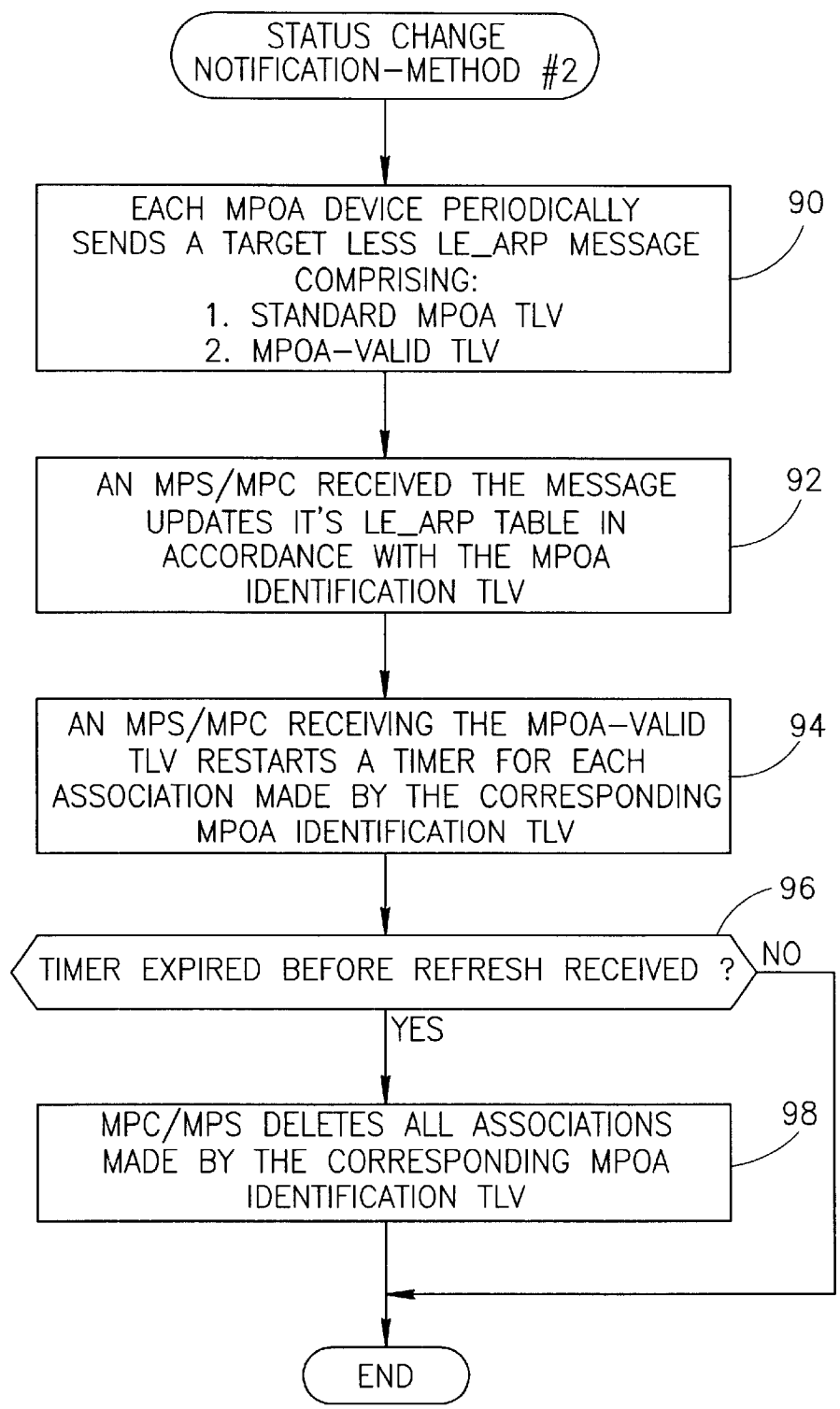
FIG. 5 is a flow diagram illustrating the second status change notification method of the present invention.

A flow diagram illustrating the second status change notification method of the present invention is shown in FIG. 5. It is important to note that for an MPOA network to take maximum advantage of the second method of the present invention, all MPOA devices in a network must be adapted to perform the method of the present invention. Devices that do not perform the second of the present invention are notified of changes to the device status configuration of other devices in the network in accordance with prior art notification procedures. The normal operation of the network, however, is not affected and functions in accordance with prior art MPOA networks.

In operation, only the entity in the device (e.g., LEC, MPOA device or $3^{rd}$ party device responsible for management of the modified LE_ARP table of the present invention) need be adapted to perform the method of the present invention. MPOA Servers and MPOA Clients must be adapted to notify their associated LECs about status changes, i.e., MPS or MPC being enabled or disabled, starting or stopping of a LEC, etc. In addition, the MPS and MPCs must be adapted to perform the second method of the present invention.

With reference to FIG. 4, each MPOA device is adapted to periodically send a targetless LE_ARP message which comprises the standard MPOA identification TLV and an MPOA-VALID TLV of the present invention (step 90). Each MPOA device, on each LEC that it is enabled on, sends the standard targetless LE_ARP message every $T_1$ seconds wherein $T_1$ is greater than one second. The targetless LE_ARP message comprises a standard MPOA identification TLV that represents the current status of the device. In addition, a user TLV known as a MPOA-VALID TLV is added to the message that specifies the validity time $T_2$ of the MPOA identification TLV. Note that by default, the value of $T_2$ equals $N_1 \times T_1$ wherein $N_1$ is a positive integer.

Note that the second method utilizes the LE_ARP cache table that is created and maintained in each LEC in addition to creating a new MPOA Device Type table to hold MPOA device type, associated LEC ATM address and a validation time-out value. The LE_ARP table functions to store, among other things, MAC to ATM address mappings. Each ATM entry in the cache, however, may have multiple MAC addresses associated therewith. The ATM addresses are used to establish the Data Direct VCs from one LEC to another, i.e., from one ATM address to another. Each Data Direct VC is related to more than one entry in the LE_ARP cache table since the LEC is typically an edge device having a LAN positioned behind it representing a potentially large number of MAC addresses.

In accordance with the invention, another table, the MPOA Device Type TLV table, is created and maintained. This table contains for each MPOA device type TLV, a time out field which functions to track the remaining time for which the associated entry is valid. Examples of an LE_ARP cache table and MPOA Device Type TLV table suitable for use with the second method of the present invention that resides on each MPOA device is presented below in Tables 3 and 4.

TABLE 3

MPOA LE_ARP Cache Table

| LEC ATM Address | MAC Address |
| --- | --- |
| ATM A1 | MAC M1 |
| ATM A1 | MAC M2 |
| ATM A1 | MAC M3 |
| ATM A2 | MAC M4 |
| ATM A3 | MAC M5 |
| ATM A3 | MAC M6 |

A MPOA Device Type TLV table is also created in each MPOA device, an example of which is shown below in Table 2.

TABLE 4

MPOA Device Type Table

| Device Type TLV | LEC ATM Address | Validation Time-Out |
| --- | --- | --- |
| MPS | ATM A1 | Time T1 |
| MPC | ATM A2 | Time T2 |
| MPC | ATM A3 | Time T3 |

Table 3 presented above illustrates an example LE_ARP cache table having a plurality of entries. Each LEC ATM address (i.e., ATM address A1) may have more than one MAC address associated therewith. The MAC addresses, however, are unique and are different for each record, i.e., MAC address M1, M2 and M3. Table 4 holds the MPOA device type TLV, LEC ATM address and validation time-out period (i.e., remaining time). Note that all the LEC ATM addresses present in Table 3 must also have entries in Table 3 since for an ATM address to appear in Table 4, the device by default must already know about its MAC address. The reverse, however, is not necessarily the case as not all LECs send the TLV since not all are MPOA devices. Note that each LEC ATM address associated with an MPOA TLV has an independent validation time-out period field. Note that Tables 3 and 4 may be implemented as individual tables or as a single combined table without effecting the operation of the invention.

The data stored in the Device Type TLV field comprises the type of device (MPS, MPC, MPS/MPC or non-MPOA device), MPS MAC addresses (if the type is MPS), MPS Control ATM address (if the type is MPS), MPC Control ATM address (if the type is MPC) and MPS MAC addresses. Note that in accordance with the MPOA standard, each MPOA component registers its MPOA Device Type TLV with each LEC on which it is configured.

An MPS or MPC that receives the targetless LE_ARP message with or without a standard MPOA identification TLV, functions normally as defined in the ATM Forum MPOA standard as described above with respect to the LEC ATM address, the MAC address and the MPOA identification TLV association (step 92). A LEC receiving such a frame, operates the same as defined in the standard, whereby the MAC to ATM binding entry is updated to reflect the MPOA identification TLV. Note that in cases where more than one entry corresponds to an ATM address, all entries are updated.

An MPS or MPC that receives the targetless LE_ARP message with an MPOA-VALID TLV, functions to restart a timer for each association made by the corresponding MPOA identification TLV (step 94). The timer is restarted and set to the value $T_2$ seconds as conveyed in the MPOA-VALID TLV itself. If the timer expires before a new targetless LE_ARP message is received to refresh the MPOA identification TLV (step 96), the MPS or MPC deletes all the associations made by the corresponding MPOA identification TLV (step 98).

Preferably, MPSs and MPCs are configured such that $T_1$ is in the range of 1 to 600 seconds with the default being approximately 10 seconds and 0 indicating disabling of the feature. In addition, the value of $N_1$ is a positive integer preferably in the range of 1 through 10 with 4 being the preferred default value.

Note that an MPOA device that does support the feature of the second method of the invention will not start the $T_2$ timer if it does not receive the MPOA-VALID TLV. An MPOA device that does not support the feature of the second method of the invention should be adapted to ignore the MPOA-VALID TLV. Note also that targetless LE_ARP messages do not have acknowledgements associated with them. In the worst case, however, wherein multiple targetless LE_ARP messages that are lost, an MPS or MPC eventually determines that a neighboring MPS or MPC is disabled and will eventually learn its new current status.

In the case when both sides of a connection perform the second method of the present invention, the MPOA-VALID TLV will be received and recognized. In response, the device places the validation time-out entry T2 in the LE_ARP cache table. The validation time-out field is decremented and if for some reason, the value reaches zero, i.e., times out, the corresponding entry is deleted from the cache.

Note that the MPSs and MPCs instruct all LECs associated with the MPOA device (there can be more than one LEC) to generate the keep alive messages (i.e., targetless LE_ARP messages having a MPOA-VALID TLV) for each ELAN since each LEC is a member of only one ELAN (i.e., one message per ELAN). This is the case when an MPS or MPC has associated with it multiple LECs, each LEC being a member of a separate ELAN. The keep alive messages are sent from the LEC that generated the message to all other LECs in the ELAN. The MPSs and MPCs communicate with their associated LEC via some form of internal communications as they are typically collocated in the same device (i.e., chassis or box).

It is important to note that the keep alive message may comprise any suitable message that conveys sufficient information to indicate the value the validation timer is to be refreshed to. It is preferable, however, to utilize the MPOA-VALID TLV of the present invention in combination with the standard MPOA identification TLV as conveyed in the targetless LE_ARP message.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. In an Asynchronous Transfer Mode (ATM) based Multiple Protocol Over ATM (MPOA) network running LAN Emulation (LE), a method of notifying devices in said network of changes in device configuration status, said method comprising the steps of:

providing an MPOA device type TLV table for storing device type, Media Access Control (MAC) and control ATM address data;

providing an LE_ARP cache table for storing LEC ATM to MAC address mappings;

detecting changes in device status configuration in an MPOA device;

if changes in said device status are detected and if said MPOA device comprises an MPOA Server, releasing all LE Data Direct VCs (DDVCs) to all LAN Emulation Client (LEC) ATM addresses associated with known MPOA Server and MPOA Client neighbors;

if changes in said device status are detected and if said MPOA device comprises an MPOA Client, releasing all LE Data Direct VCs (DDVCs) to all LEC ATM addresses associated with known MPOA Server neighbors; and deleting all entries in said MPOA device type TLV table and said LE_ARP cache table associated with LEC ATM destination addresses of released DDVCs in an MPOA device for which a DDVC was released.

2. The method according to claim 1, wherein said step of detecting comprises the step of detecting the starting of an MPOA Server.

3. The method according to clam 1, wherein said step of detecting comprises the step of detecting the stopping of an MPOA Server.

4. The method according to claim 1, wherein said step of detecting comprises the step of detecting the starting of an MPOA Client.

5. The method according to claim 1, wherein said step of detecting comprises the step of detecting the stopping of an MPOA Client.

6. The method according to claim 1, wherein said step of detecting comprises the step of detecting the starting of a LEC associated with an MPOA device.

7. The method according to claim 1, wherein said step of detecting comprises the step of detecting the stopping of a LEC associated with an MPOA device.

8. The method according to claim 1, wherein said step of detecting comprises the step of detecting the association of a LEC with an MPOA device.

9. The method according to claim 1, wherein said step of detecting comprises the step of detecting the de-association of a LEC with an MPOA device.

10. The method according to claim 1, wherein said MPOA device type TLV table and said LE_ARP cache table comprises a combined table holding the contents of an LE_ARP cache table and an MPOA Device Type TLV table.

11. In an Asynchronous Transfer Mode (ATM) based Multiple Protocol Over ATM (MPOA) network running LAN Emulation (LE), a method of notifying devices in said network of changes in device configuration status, said method comprising the steps of:

associating a validation time-out field with each MPOA device type TLV associated with a LAN Emulation Client (LEC) ATM address and registered within each MPOA device;

periodically sending a keep alive message to neighboring MPOA devices;

receiving said keep alive message by an MPOA Server or Client and in response thereto, restarting a validation timer corresponding to a validation time-out field associated with a registered MPOA device type TLV; and deleting an MPOA device type TLV entry corresponding to a LEC ATM address whose validation timer expires before a refresh of said validation timer is received.

12. The method according to claim 11, wherein said step of periodically sending said keep alive message comprises the step of periodically sending said keep alive messages every $T_1$ seconds.

13. The method according to claim 12, wherein $T_1$ is within the range of 1 to 600 seconds.

14. The method according to claim 11, wherein said keep alive message comprises a targetless LE_ARP message having a standard MPOA Type, Length, Value (TLV) and an MPOA-VALID TLV specifying the value $T_2$ of said validation time-out field.

15. The method according to claim 11, wherein said keep alive message comprises a targetless LE_ARP message having a standard MPOA Type, Length, Value (TLV) and an MPOA-VALID TLV specifying the value $T_2$ of said validation time-out field whereby $T_2$ is given by $T_2=N_1 \times T_1$, whereby $T_1$ is represents the time between the sending of said keep alive messages and $N_1$ is a positive integer.

16. The method according to claim 15, wherein $N_1$ is a positive integer between 1 and 10.

17. The method according to claim 11, wherein said MPOA Device Type TLV entries are stored in an MPOA device type TLV table.

18. The method according to claim 11, wherein said MPOA Device Type TLV entries are stored in an LE_ARP cache table adapted to hold said MPOA Device Type TLV entries.

19. The method according to claim 11, further comprising the step of processing a keep alive message comprising a targetless LE_ARP message containing an MPOA-VALID TLV without a validation time-out field in accordance with the ATM Forum MPOA standard.

* * * * *